No. 643,411. Patented Feb. 13, 1900.
F. G. KAMMERER.
FILTER.
(Application filed Dec. 21, 1898.)
(No Model.) 3 Sheets—Sheet 1.

Witnesses:
Carl H. Crawford
C. W. Hills

Inventor:
Frank G. Kammerer
by Poole & Brown his Attys

No. 643,411. Patented Feb. 13, 1900.
F. G. KAMMERER.
FILTER.
(Application filed Dec. 21, 1898.)
(No Model.) 3 Sheets—Sheet 3.

Witnesses:
Carl H. Crawford
C. W. Hills

Inventor:
Frank G. Kammerer
by Poole & Brown his Attys

UNITED STATES PATENT OFFICE.

FRANK G. KAMMERER, OF CHICAGO, ILLINOIS.

FILTER.

SPECIFICATION forming part of Letters Patent No. 643,411, dated February 13, 1900.

Application filed December 21, 1898. Serial No. 699,903. (No model.)

*To all whom it may concern:*

Be it known that I, FRANK G. KAMMERER, of Chicago, in the county of Cook and State of Illinois, have invented certain new and useful Improvements in Means for Furnishing Pure Water; and I do hereby declare that the following is a full, clear, and exact description thereof, reference being had to the accompanying drawings, and to the letters of reference marked thereon, which form a part of this specification.

This invention relates to an improved construction in means for furnishing pure water for drinking and other purposes where pure water is required; and it consists in the matters hereinafter set forth, and pointed out in the appended claims.

Figure 1:
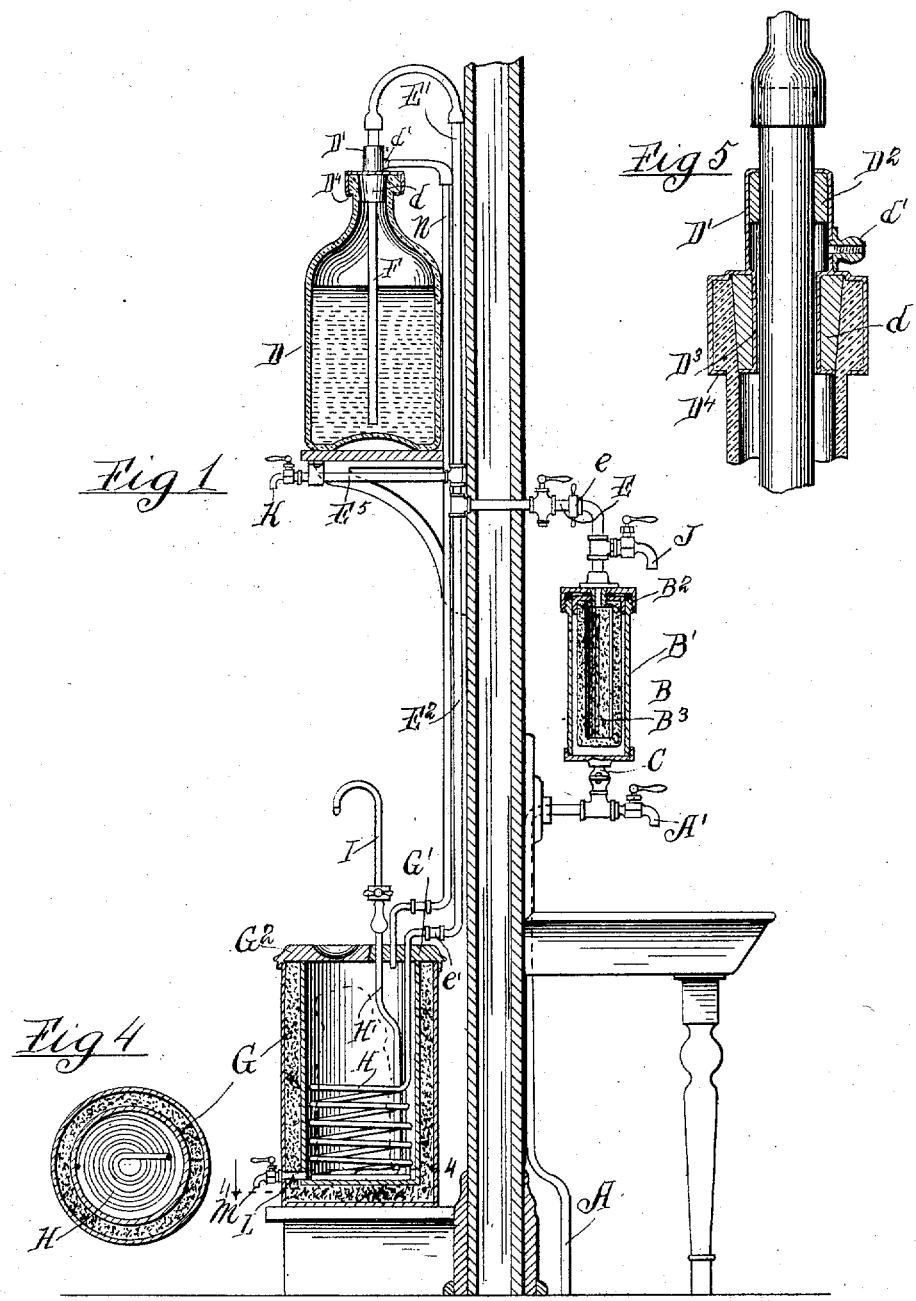
Figure 2:
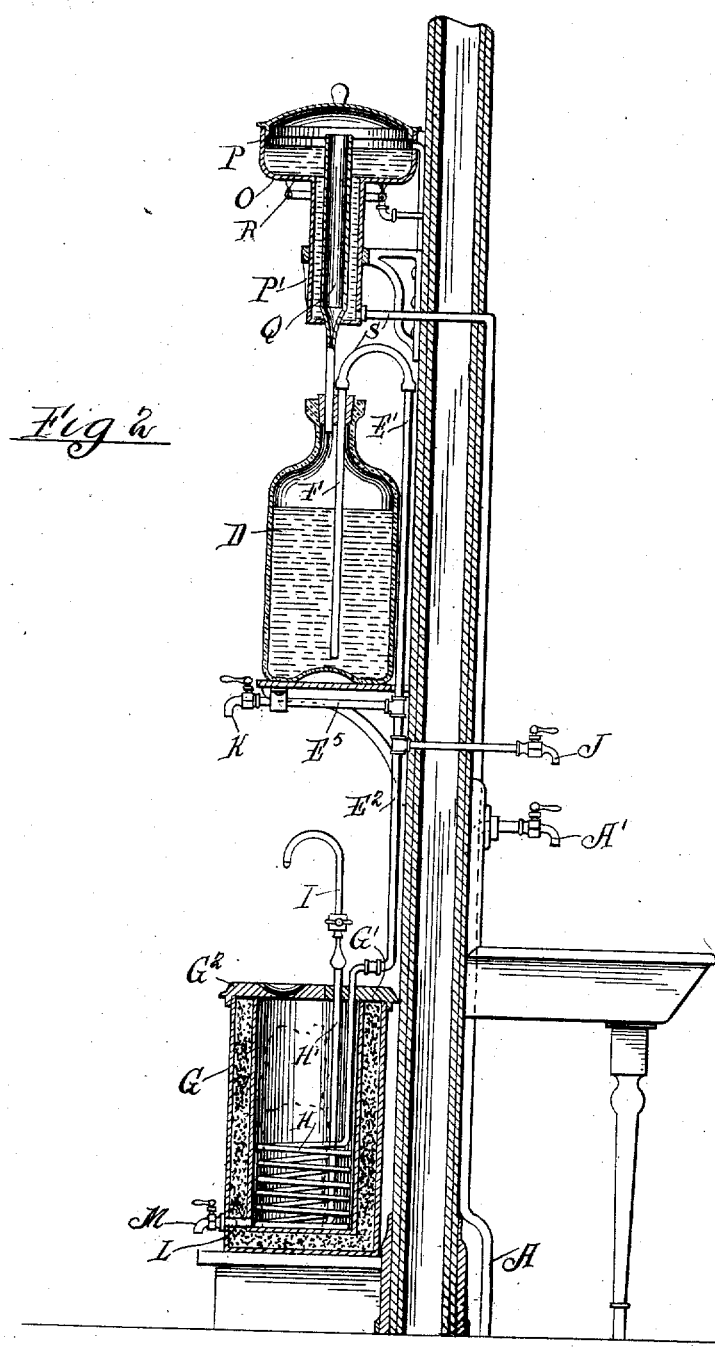
Figure 3:
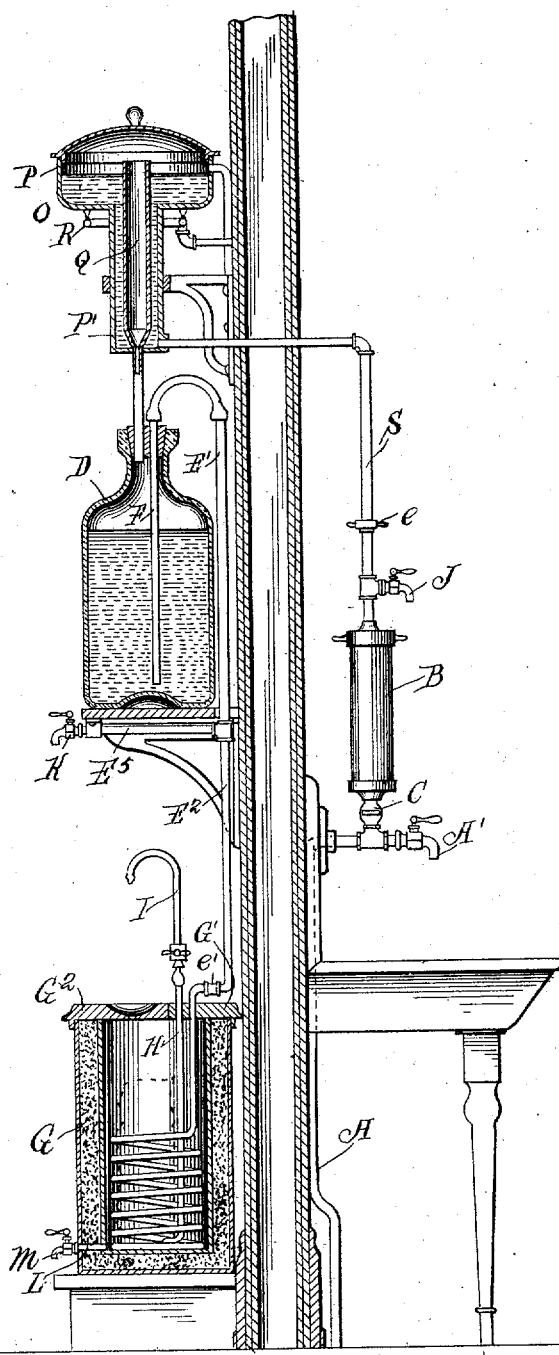

In the accompanying drawings, illustrating my invention, Figure 1 is a sectional view of an apparatus embodying my invention in a form adapted for domestic use. Fig. 2 is a similar view showing a modified form thereof. Fig. 3 is a similar view showing still another modification. Fig. 4 is a horizontal cross-section of the refrigerator, taken on line 4 4 of Fig. 1. Fig. 5 is a vertical section of the stopper.

As shown in said drawings, Fig. 1, A indicates a water-supply pipe which is connected with a city water-main or other source of water-supply. B is a filter, having an inlet-pipe C, which is connected with the supply-pipe A. D indicates a storage vessel or receptacle for filtered water having an outlet-opening in its top only. Said vessel is herein shown as having the form of a glass bottle, but may be of any suitable material or construction. Said tank or receptacle is connected with the filter by pipes E and E'. F is a depending tube which extends downwardly through the opening in the top of the vessel and is connected at its upper end with the pipe E'. Said tube F and pipe E' constitute a siphon by which water may be drawn from the said vessel. G indicates a refrigerator located below the level of the storage vessel and within which is located a cooling-pipe H, which is connected at one end with a pipe $E^2$, which leads to and is connected with the pipe E' and at its opposite end with a vertical pipe H', terminating in a discharge-faucet I. Said refrigerator, as herein shown, consists of a receptacle having double walls and adapted to contain ice, and the cooling-pipe H is shown as having the form of a coil located within the refrigerator. The apparatus embracing the parts referred to provides means for filtering, storing, and cooling water. Water from the supply-pipe A will enter the filter B and after passing therethrough will be delivered through the pipe E to the storage-tank D. The filtered water may be drawn from said tank from the faucet I through the siphon-tube F and pipes E' and $E^2$, and the water so drawn will be cooled before its discharge from the faucet by passing through the pipe H within the refrigerator.

The drawings show an apparatus such as might be located in part in a kitchen and in part in an adjoining apartment and which is adapted for supplying filtered but not cooled water in the kitchen and water which is both filtered and cooled in the adjoining apartment. In this instance the filter inlet-pipe C is shown as connected with and forming a branch of a supply-pipe, which terminates in a discharge-faucet A', from which ordinary or unfiltered water may be drawn, as desired, the filter being located in the same apartment as the faucet A', which may be that used in a kitchen. Said inlet-pipe may be conveniently connected with the supply-pipe by a T-fitting interposed between the end of said supply-pipe and the faucet A'. The filter shown is of a common type, consisting of a case B', provided with a removable cap or cover $B^2$ and a porous cup $B^3$, attached to said cover and depending within the case, the outlet-pipe E being connected with the cover and being in communication with the interior of the cup through the medium of a hole in said cover. The pipe E is preferably attached permanently to the cover at its lower end and provided with a union or separable joint $e$ at a point above its lower end, in order to enable the cover and porous cup to be easily removed from the filter for the purpose of cleaning said cup. The pipe E is shown as extending horizontally through the wall which separates the two apartments referred to and as connected with a vertical pipe, the portion E' of which above the pipe E forms a passage for water both toward and from the storage-receptacle. The pipe E is shown as provided with a faucet J, through which filtered water may be drawn from the storage-receptacle when desired, it being obvious that water drawn from either of the pipes E, E', or E² will be above or beyond the filter and will be properly filtered. Another faucet K is shown as connected by a branch pipe E⁵ with the pipe E' below the storage-receptacles in order to enable filtered but uncooled water to be drawn from the storage-tank in the apartment in which said tank is located. It will be understood that the pipes connected with the storage vessel being always full of water the siphon formed by the upper part of the pipe E' and the tube F will always be in condition for operation, and water may be at any time drawn from the said vessel through any one of the faucets I, J, or K, as desired.

The refrigerator G, shown as one convenient form of such refrigerator, is made of cylindric form and is provided with a top or cover consisting of a stationary part G', which is removably attached to the body of the refrigerator, and a movable part G², which is hinged to the stationary part to afford access to the interior of the refrigerator and to permit the insertion of ice therein. The pipes E² and H' are shown as passing through the stationary part G' of the cover. The union-joint e', located above the said cover, is adapted to permit the lower and upper parts of said pipe to be disconnected a short distance above the said cover, so that when the lower part of the pipe is disconnected from the upper one the stationary part G' of the cover may be removed from the body of the refrigerator, with the cooling-pipe H attached thereto. Such removal of the cooling-pipe will be occasionally desirable or necessary to permit the thorough cleansing of the interior of the refrigerator. The refrigerator will preferably be provided with an outlet-pipe L, provided with a faucet M, through which water accumulating from the melted ice may be drawn from the refrigerator when required. Said cooling pipe or coil is preferably provided at its lower part with a flat spiral coil, which rests on the bottom of the refrigerator-chamber and which, being constantly submerged in the cold water and beneath the ice, affords the principal means of cooling the water passing through the coil.

The orifice of the storage vessel D when the same is made of glass in the form of a bottle, as shown, will preferably be closed by a stopper or cork d, through which the siphon-tube F is inserted. N is an overflow-pipe, the upper end of which communicates with the vessel through a passage in the stopper d and the lower end of which may lead to any place suitable for the disposal of overflow-water. Conveniently the lower end of the said overflow-pipe may pass through the cover G' of the refrigerator and discharge therein. The overflow-pipe will be needed only to prevent excessive pressure on the storage vessel should the filter be left in operation until the storage vessel is completely filled, it being obvious that in the absence of an overflow-pipe the vessel would under these circumstances be subjected to the full pressure of the city main. The storage vessel may, however, if desired, be so constructed as to withstand the full pressure of the water-supply system in connection with which it is used, in which case any overflow-pipe will be unnecessary.

In Fig. 2 is shown a water-supply apparatus, which is identical in all respects with that shown in Fig. 1, with the exception that in place of the filter B (before described) in this instance a still or distilling device O is employed to supply water to the storage vessel. Said still, as shown, consists of a water vessel P, having a depending tubular leg P', a condensing and discharge tube Q, which passes through said leg and has an open upper end located within the vessel P above the water-line therein, and an annular gas-burner R, located beneath the main part of the said vessel. A water-supply pipe S is connected with the bottom of the water-leg P', and an overflow-pipe is connected with the side of the vessel P. The discharge-tube Q enters the storage vessel through the stopper or cork therein. Obviously any other form of distilling apparatus may be employed for supplying the water to the storage vessel instead of that herein shown.

In Fig. 3 I have shown an apparatus in which is combined the features illustrated in Figs. 1 and 2—that is to say, it contains the filter illustrated in said Fig. 1 and also the distilling apparatus shown in Fig. 2. The parts illustrated in this instance are constructed in the same manner as shown in said Figs. 1 and 2 and are lettered the same in the drawings, except that in this instance a pipe S leads from the outlet-opening of the filter to the leg P' of the distilling apparatus, by which water is delivered directly from the filter to the distilling apparatus.

As a further and separate improvement I have provided a closure for the storage vessel of a form adapted for the convenient connection of the siphon-tube and overflow-pipe with said storage vessel, such inclosure being adapted for use not only in connection with the special apparatus herein shown, but in other cases where it may be desired to connect a siphon-tube and an overflow-pipe with a similar vessel. Said inclosure embraces in connection with the cork or stopper d a metal cap D', of tubular form, which forms an annular chamber above the stopper proper, which chamber communicates with a central opening in the stopper which is larger than the siphon-tube that passes therethrough, and said cap is provided with a like projecting tube d' with which the overflow-pipe is connected. Said cap is also provided above said overflow-pipe with a packing-ring D², which surrounds the siphon-tube and forms a tight joint between the same and the cap. By this construction the siphon-tube and overflow-pipe may both be connected with the stopper without making the same unduly large and in a manner to permit the convenient insertion and removal of the siphon-tube and to insure a tight joint between the same and the stopper while at the same time affording free communication between the interior of the storage vessel and the overflow-pipe.

As a convenient construction in the closure the cap proper has attached to it a depending tube D³, which passes through the cork or stopper d and has a flange at its lower end adapted to hold the stopper firmly in place upon the cap. The top of the said cap is moreover provided with an inwardly-extending flange which extends over the packing-ring and serves to confine the same in place.

In some cases it may be desirable to secure the closure firmly in the mouth of the vessel—as, for instance, when the same is subject to considerable internal pressure I provide in connection with the cap referred to a device by which it may be secured to the neck of the vessel when said neck is provided with a flange like that of an ordinary bottle. This holding device may be of any suitable form; but preferably and as an advantageous construction I provide the said cap with a depending flange D⁴, which surrounds an upper part of the neck of the vessel and projects slightly below the shoulder thereon, so that it may be bent inwardly to confine the cap upon the neck of the vessel. This provision for securing the cap or closure in the mouth of the vessel may be desirable, even when the vessel is subject to no special pressure from the inside, in order to securely hold the said closure and the pipes connected therewith in place and prevent their disconnection or dislodgment in the usual service or use of the apparatus.

I claim as my invention—

1. The combination with a refrigerator, of a storage vessel located above the refrigerator and having an opening in its top only, a water inlet and exit pipe connected with the storage vessel by a siphon, a water-supply pipe connected with said inlet and exit pipe, a discharge-pipe also connected with said inlet and exit pipe and leading downwardly from said storage vessel, an overflow-pipe connected with the top of the storage vessel, and a cooling-pipe within the refrigerator connected with the lower end of the discharge-pipe and terminating in a discharge-faucet.

2. The combination of a refrigerator, a storage vessel located above the level of the refrigerator and having an opening in its top only, a water-filter, a pipe supplying water to said filter under pressure, said filter being provided with a discharge-passage through which water is discharged into said storage vessel through the pressure in the discharge-pipe, a supply-pipe connected with the storage vessel by a siphon and leading to a refrigerator, an overflow-pipe leading from the top of the storage vessel and a cooling-pipe in said refrigerator connected with said discharge-pipe and terminating in a faucet.

3. The combination of a refrigerator, a storage vessel located above the level of the said refrigerator and provided with an opening in its top only, a water-filter, a pipe supplying water to said filter under pressure, a discharge-pipe connected with the storage vessel by a siphon and leading to the refrigerator, a pipe leading from the discharge-opening of the filter to the said discharge-pipe and through which water is delivered to said pipe and to the storage vessel through the pressure of the water in the supply-pipe, and a cooling-pipe in the refrigerator connected with the said discharge-pipe and terminating in a faucet.

4. The combination of a water-filter, a pipe supplying water thereto under pressure, a storage vessel, an inlet and exit pipe connected with said storage vessel, a pipe leading from the filter to said inlet and exit pipe through which water is delivered to the storage vessel through the pressure in the supply-pipe, a discharge-pipe connected with said inlet and exit pipe and through which water from a storage vessel is discharged by gravity, said discharge-pipe being provided with a faucet, and an overflow-pipe leading from the top of said storage vessel.

5. The combination of a refrigerator, a storage vessel located above the level of said refrigerator and provided with an opening in its top only, a water-filter, a pipe supplying water to said filter under pressure, a distilling apparatus into which water is discharged from the filter by pressure within the supply-pipe, the said distilling apparatus being located above the storage vessel and discharging into the same by gravity, a discharge-pipe connected with the storage vessel by a siphon and leading to the refrigerator, a cooling-pipe in the refrigerator connected with the discharge-pipe from the storage vessel and terminating in a faucet, and an overflow-pipe connected with the top of the storage vessel.

In testimony that I claim the foregoing as my invention I affix my signature, in presence of two witnesses, this 15th day of December, A. D. 1898.

FRANK G. KAMMERER.

Witnesses:
R. CUTHBERT VIVIAN,
C. W. HILLS.